(12) United States Patent
Ekanayake et al.

(10) Patent No.: US 10,598,094 B2
(45) Date of Patent: Mar. 24, 2020

(54) HEAT PIPE TEMPERATURE MANAGEMENT SYSTEM FOR WHEELS AND BUCKETS IN A TURBOMACHINE

(71) Applicant: General Electric Company, Schenectady, NY (US)

(72) Inventors: Sanji Ekanayake, Mableton, GA (US); Thomas Edward Wickert, Greenville, SC (US); Alston Ilford Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 15/122,597

(22) PCT Filed: Apr. 2, 2015

(86) PCT No.: PCT/US2015/024128
§ 371 (c)(1),
(2) Date: Aug. 30, 2016

(87) PCT Pub. No.: WO2016/160023
PCT Pub. Date: Oct. 6, 2016

(65) Prior Publication Data
US 2018/0016985 A1 Jan. 18, 2018

(51) Int. Cl.
*F02C 7/00* (2006.01)
*F02C 7/14* (2006.01)
(Continued)

(52) U.S. Cl.
CPC ............. *F02C 7/14* (2013.01); *F01D 5/082* (2013.01); *F01D 5/088* (2013.01); *F01D 5/181* (2013.01);
(Continued)

(58) Field of Classification Search
CPC .... F02C 7/14; F02C 7/06; F02C 7/143; F02C 7/18; F02C 6/08; F01D 25/125;
(Continued)

(56) References Cited

U.S. PATENT DOCUMENTS

| 3,429,122 A | 2/1969 | Pravda et al. |
| 3,842,596 A | 10/1974 | Gray |

(Continued)

FOREIGN PATENT DOCUMENTS

| EP | 0584958 A1 | 3/1994 |
| EP | 0 541 325 B1 | 5/1997 |

(Continued)

OTHER PUBLICATIONS

Ekanayake et al., Apr. 2, 2015, U.S. Appl. No. 14/676,884.
(Continued)

*Primary Examiner* — Todd E Manahan
*Assistant Examiner* — Edwin Kang
(74) *Attorney, Agent, or Firm* — Dale Davis; Hoffman Warnick LLC (57) ABSTRACT

A turbomachine includes a compressor configured to compress air received at an intake portion to form a compressed airflow that exits into an outlet portion. A combustor is operably connected with the compressor, and receives the compressed airflow. A turbine is operably connected with the combustor, and receives the combustion gas flow. The turbine has a plurality of wheels and a plurality of buckets. The turbine receives compressor bleed off air to cool the wheels and buckets. A cooling system is operatively connected to the turbine. The cooling system includes a plurality of heat pipes located axially upstream of at least one of the wheels. The heat pipes are operatively connected to a bearing cooler system. The heat pipes and the bearing cooler
(Continued)

system are configured to transfer heat from the compressor bleed off air to one or more heat exchangers.

20 Claims, 7 Drawing Sheets

(51) Int. Cl.

| | | |
|---|---|---|
| F28D 15/02 | (2006.01) | |
| F02C 6/18 | (2006.01) | |
| F01D 5/08 | (2006.01) | |
| F02C 7/224 | (2006.01) | |
| F01D 9/06 | (2006.01) | |
| F02C 7/143 | (2006.01) | |
| F01D 5/18 | (2006.01) | |
| F02C 7/18 | (2006.01) | |
| F01D 25/12 | (2006.01) | |
| F02C 3/04 | (2006.01) | |
| F02C 7/06 | (2006.01) | |
| F28F 23/00 | (2006.01) | |
| F28D 21/00 | (2006.01) | |

(52) U.S. Cl.
CPC .......... *F01D 9/065* (2013.01); *F01D 25/125* (2013.01); *F02C 3/04* (2013.01); *F02C 6/18* (2013.01); *F02C 7/06* (2013.01); *F02C 7/143* (2013.01); *F02C 7/18* (2013.01); *F02C 7/185* (2013.01); *F02C 7/224* (2013.01); *F28D 15/0233* (2013.01); *F28D 15/0275* (2013.01); *F28F 23/00* (2013.01); *F05D 2260/208* (2013.01); *F05D 2260/213* (2013.01); *F05D 2300/5024* (2013.01); *F28D 2021/0026* (2013.01)

(58) Field of Classification Search
CPC .......... F01D 25/18; F01D 5/082; F01D 5/088; F01D 5/181; F01D 9/065; F28D 15/0233; F28D 15/0275; F28D 2021/0026; F28F 23/00; F05D 2260/208; F05D 2260/213; F05D 2260/98
See application file for complete search history.

(56) References Cited

U.S. PATENT DOCUMENTS

| | | | |
|---|---|---|---|
| 4,137,705 A * | 2/1979 | Andersen | F02C 7/14 60/39.08 |
| 4,741,153 A | 5/1988 | Hallinger et al. | |
| 5,100,291 A | 3/1992 | Glover | |
| 5,160,096 A | 11/1992 | Perkins et al. | |
| 5,161,365 A | 11/1992 | Wright | |
| 5,178,514 A | 1/1993 | Damiral | |
| 5,267,608 A | 12/1993 | Coffinberry | |
| 5,722,241 A | 3/1998 | Huber | |
| 6,385,958 B2 | 5/2002 | Leone et al. | |
| 6,393,825 B1 | 5/2002 | Leone et al. | |
| 7,587,887 B2 | 9/2009 | Horiuchi et al. | |
| 8,033,116 B2 | 10/2011 | Sengar et al. | |
| 8,096,747 B2 | 1/2012 | Sengar et al. | |
| 8,112,998 B2 | 2/2012 | Liu et al. | |
| 8,157,512 B2 | 4/2012 | Zhang et al. | |
| 8,240,975 B1 | 8/2012 | Ryznic | |
| 8,359,824 B2 | 1/2013 | Zhang et al. | |
| 8,397,516 B2 | 3/2013 | Maldonado | |
| 8,596,073 B2 | 12/2013 | Zhang | |
| 8,794,907 B1 | 8/2014 | Brostmeyer et al. | |
| 8,813,503 B2 | 8/2014 | Jones | |
| 8,816,521 B2 | 8/2014 | Kleen et al. | |
| 2005/0050877 A1* | 3/2005 | Venkataramani | F02C 7/047 60/39.093 |
| 2007/0017208 A1 | 1/2007 | Ralls, Jr. | |
| 2008/0141954 A1 | 6/2008 | Norris et al. | |
| 2008/0159852 A1 | 7/2008 | Stephenson et al. | |
| 2010/0054926 A1 | 3/2010 | Zhang et al. | |
| 2010/0236215 A1* | 9/2010 | Venkataramani | F01D 9/065 60/39.093 |
| 2011/0100020 A1 | 5/2011 | Zhang et al. | |
| 2011/0103939 A1 | 5/2011 | Zhang et al. | |
| 2011/0203291 A1* | 8/2011 | Erickson | F02C 7/224 60/776 |
| 2012/0017564 A1 | 1/2012 | Dhingra et al. | |
| 2014/0123666 A1 | 5/2014 | Ekanayake et al. | |
| 2014/0126991 A1 | 5/2014 | Ekanayake et al. | |
| 2014/0202155 A1* | 7/2014 | Ota | F22B 1/006 60/641.15 |
| 2014/0208765 A1 | 7/2014 | Ekanayake et al. | |
| 2015/0107254 A1 | 4/2015 | Shaffer et al. | |
| 2016/0290174 A1 | 10/2016 | Ekanayake et al. | |
| 2016/0290214 A1 | 10/2016 | Ekanayake et al. | |
| 2016/0290230 A1 | 10/2016 | Ekanayake et al. | |
| 2016/0290231 A1 | 10/2016 | Ekanayake et al. | |
| 2016/0290232 A1 | 10/2016 | Ekanayake et al. | |
| 2016/0290233 A1 | 10/2016 | Ekanayake et al. | |
| 2016/0290234 A1 | 10/2016 | Ekanayake et al. | |
| 2016/0290235 A1 | 10/2016 | Ekanayake et al. | |

FOREIGN PATENT DOCUMENTS

| | | |
|---|---|---|
| EP | 0 570 217 B1 | 10/1997 |
| EP | 1 741 874 A2 | 1/2007 |
| EP | 0 911 505 B1 | 2/2007 |
| EP | 1 895 123 A2 | 3/2008 |
| EP | 1 895 124 A2 | 3/2008 |
| EP | 2 000 648 A1 | 12/2008 |
| EP | 2 148 045 A1 | 1/2010 |
| EP | 2 159 377 A1 | 3/2010 |
| EP | 2241728 A2 | 10/2010 |
| EP | 2 587 028 A2 | 5/2013 |
| GB | 1 361 047 A | 7/1974 |
| GB | 1 516 041 A | 6/1978 |
| GB | 2 264 539 A | 9/1993 |
| GB | 2474567 A | 4/2011 |
| JP | H07-119489 A | 5/1995 |
| WO | 01/31181 A1 | 5/2001 |
| WO | 2016/160022 A1 | 10/2016 |

OTHER PUBLICATIONS

Ekanayake et al., Apr. 2, 2015, U.S. Appl. No. 14/676,889.
Ekanayake et al., Apr. 2, 2015, U.S. Appl. No. 14/676,895.
Ekanayake et al., Apr. 2, 2015, U.S. Appl. No. 14/676,905.
Ekanayake et al., Apr. 2, 2015, U.S. Appl. No. 14/676,917.
Ekanayake et al., Apr. 2, 2015, U.S. Appl. No. 14/676,925.
Ekanayake et al., Apr. 2, 2015, U.S. Appl. No. 14/676,936.
Ekanayake et al., Apr. 2, 2015, U.S. Appl. No. 14/676,950.
Boudreaux, K.J., "Rotor Air Coolers—Mitigate failures with tighter control of water chemistry, better materials," Nalco Power, CCJ ONline, © 2014 CCJ Online, Inc., Published by PSI Media, Inc., Las Vegas, NV, Retrieved from the internet URL: http://www.ccj-online.com/3q-2013/rotor-air-coolers/, on Sep. 29, 2016, pp. 1-5.
Cao, Y., "Miniature High-Temperature Rotating Heat Pipes and Their Applications in Gas Turbine Cooling", Frontiers in Heat Pipes (FHP), 1, 023002 (2010), Global Digital Central, ISSN: 2155-658X, USA, pp. 1-6.
International Search Report and Written Opinion issued in connection with related PCT Application No. PCT/US2015/024127 dated Jan. 29, 2016.
Extended European Search Report and Opinion issued in connection with related EP Application No. 16162983.7 dated Aug. 29, 2016.
Extended European Search Report and Opinion issued in connection with related EP Application No. 16163035.5 dated Aug. 29, 2016.
Extended European Search Report and Opinion issued in connection with related EP Application No. 16162810.2 dated Aug. 29, 2016.

(56) References Cited

OTHER PUBLICATIONS

Extended European Search Report and Opinion issued in connection with related EP Application No. 16163350.8 dated Aug. 30, 2016.
Extended European Search Report and Opinion issued in connection with related EP Application No. 16163302.9 dated Sep. 2, 2016.
Extended European Search Report and Opinion issued in connection with corresponding EP Application No. 16162095.0 dated Sep. 2, 2016.
Extended European Search Report and Opinion issued in connection with related EP Application No. 16162924.1 dated Sep. 2, 2016.
Non-Final Rejection towards related U.S. Appl. No. 14/676,905 dated Sep. 26, 2016.
Extended European Search Report and Opinion issued in connection with related EP Application No. 16161983.8 dated Oct. 4, 2016.
International Search Report and Written Opinion issued in connection with corresponding PCT application PCT/US2015/024128 dated Dec. 15, 2015.

\* cited by examiner

HEAT PIPE TEMPERATURE MANAGEMENT SYSTEM FOR WHEELS AND BUCKETS IN A TURBOMACHINE

BACKGROUND OF THE INVENTION

Exemplary embodiments of the present invention relate to the art of turbomachines and, more particularly, to a heat pipe temperature management system for wheels and buckets in a turbomachine.

Turbomachines include a compressor operatively connected to a turbine that, in turn, drives another machine such as, a generator. The compressor compresses an incoming airflow that is delivered to a combustor to mix with fuel and be ignited to form high temperature, high pressure combustion products. The high temperature, high pressure combustion products are employed to drive the turbine. Due to the high temperature of the combustion products, gas turbine wheels and buckets require cooling. Known materials have their limits and cooling has allowed wheels and buckets to operate at these high temperatures. This cooling is most commonly accomplished with air extracted from the compressor and less commonly with steam. However, negative attributes of compressor air cooling are a reduction in cycle output capacity and efficiency while the negative attributes of steam cooling include the additional component cost due to complexity. As such, there is a need for alternative wheel and bucket cooling methods.

BRIEF DESCRIPTION OF THE INVENTION

In an aspect of the present invention, a turbomachine includes a compressor configured to compress air received at an intake portion to form a compressed airflow that exits into an outlet portion. A combustor is operably connected with the compressor, and the combustor receives the compressed airflow. A turbine is operably connected with the combustor. The turbine receives combustion gas flow from the combustor. The turbine has a plurality of wheels and a plurality of buckets. The turbine receives compressor bleed off air to cool at least a portion of the plurality of wheels and at least a portion of the plurality of buckets. A cooling system is operatively connected to the turbine. The cooling system includes a plurality of heat pipes located axially upstream of at least one of the plurality of wheels. The plurality of heat pipes are operatively connected to a bearing cooler system. The plurality of heat pipes and the bearing cooler system are configured to transfer heat from the compressor bleed off air to one or more heat exchangers.

In another aspect of the present invention, a temperature management system for a turbomachine is provided. The turbomachine includes a compressor configured to compress air received at an intake portion to form a compressed airflow that exits into an outlet portion. A combustor is operably connected with the compressor, and the combustor receives the compressed airflow. A turbine is operably connected with the combustor, and the turbine receives the combustion gas flow from the combustor. The turbine has a plurality of wheels and a plurality of buckets. The turbine receives compressor bleed off air from the compressor to cool at least a portion of the plurality of wheels. The temperature management system includes a plurality of heat pipes located axially upstream from at least one of the plurality of wheels. The plurality of heat pipes are operatively connected to a bearing cooler system. The plurality of heat pipes and the bearing cooler system are configured to transfer heat from the compressor bleed off air to one or more heat exchangers.

In yet another aspect of the present invention, a method of transferring heat from a turbomachine is provided. The method includes a passing step that passes an airflow through a compressor. The compressor acts on the airflow to create a compressed airflow, and a portion of the compressed airflow is routed to a compressor bleed-off airflow directed at a turbine wheel. An extracting step extracts heat from the compressor bleed-off airflow by thermally conducting the heat to a plurality of heat pipes. The plurality of heat pipes are in thermal communication with one or more heat exchangers. A conducting step conducts heat from the plurality of heat pipes to a bearing. The bearing has lubrication oil, and the lubrication oil transfers the heat to a lubrication oil cooler. The compressor bleed-off airflow is cooled by the plurality of heat pipes.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
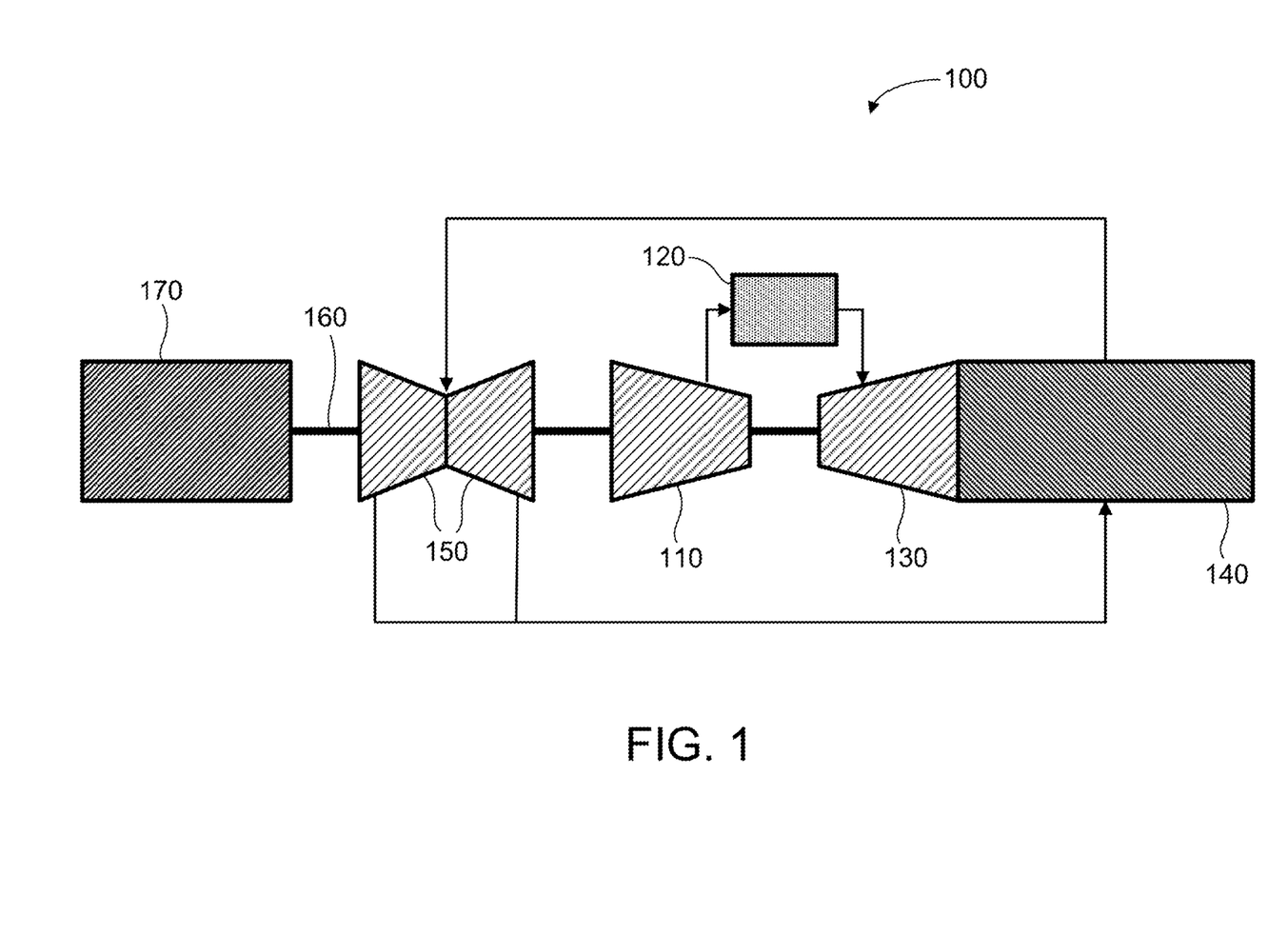
FIG. 1 illustrates a simplified schematic diagram of a turbomachine.

FIG. 1 illustrates a simplified diagram of a turbomachine 100. The turbomachine includes a compressor 110 operably connected to a combustor 120, and the combustor 120 is operably connected to a turbine 130. The turbine's exhaust may be operably connected to a heat recovery steam generator (HRSG) 140. The HRSG 140 generates steam that is directed into a steam turbine 150. In this example, all the individual turbomachines are arranged in a single shaft configuration, and the shaft 160 drives a generator 170. It is to be understood that the term turbomachine includes compressors, turbines or combinations thereof.

Figure 2:
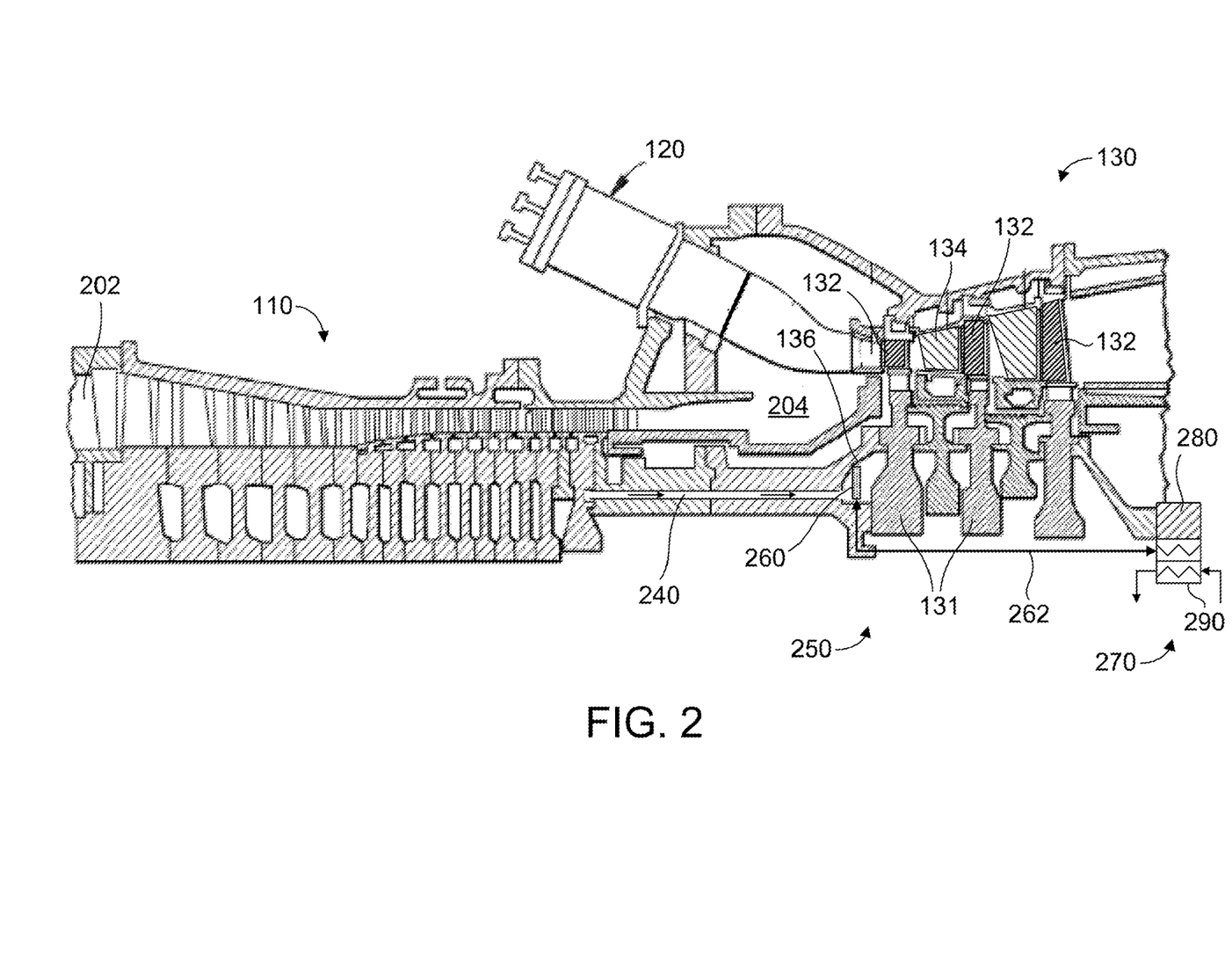
FIG. 2 illustrates a partially schematic, axial sectional view through a portion of the turbomachine, according to an aspect of the present invention.

FIG. 2 is a partially schematic, axial sectional view through a portion of the turbomachine, according to an aspect of the present invention. The turbomachine 100 includes a compressor 110 having an intake portion 202 and an outlet portion 204. The compressor compresses air received at the intake portion 202 and forms a compressed airflow that exits from/into the outlet portion 204. The combustor 120 is operably connected with the compressor 110, and the combustor 120 receives the compressed airflow. The turbine 130 is operably connected with the combustor 120, and the turbine 130 receives combustion gas flow from the combustor 120. The turbine also includes a plurality of buckets 132 attached to a plurality of wheels 131, and a plurality of nozzles 134. The term "buckets" and "blades" may be used interchangeably, and are understood to refer to rotating elements in a gas turbine.

The turbine 130 of a turbomachine utilizes air extracted from the compressor 110 to cool the hot metal components to a temperature that is tolerable to the component base metal properties. The turbine rotating components (e.g., wheels 131 and buckets 132) are cooled via internal passages while the stationary components (e.g., nozzles 134) are cooled via external passages. Since the external passages are more accessible, a number of methods are known in the art for augmenting the cooling of the stationary components. The rotating components may be cooled by air bled off the compressor. This compressor bleed off air is routed to the rotating components (i.e., wheels 131 and buckets 132) via duct 240. The bleed off air passes over the wheels 131 and through the buckets 132, thereby cooling the components via convective heat transfer.

However, this cooling (or temperature management) process can be improved if the cooling air is reduced in temperature. According to the present invention, the cooling system 250 includes a plurality of heat pipes 260 located axially upstream of at least one of the plurality of wheels 131. As one example, a plurality of heat pipes 260 may be located or arranged circumferentially around the upstream side of wheel 131. The heat pipes can be affixed to the inside of the rotor barrel cooling chamber 136. The heat pipes 260 are operatively connected, via lines 262 to a bearing cooler system 270. Lines 262 may also be heat pipes. The bearing cooler system 270 cools bearing 280 (sometimes referred to as bearing #2) and the lubrication oil associated with the bearing 280. The heat pipes 260, 262 and the bearing cooler system 270 are configured to transfer heat from the compressor bleed off air (exiting from duct 240) to one or more heat exchangers 290.

Figure 3:
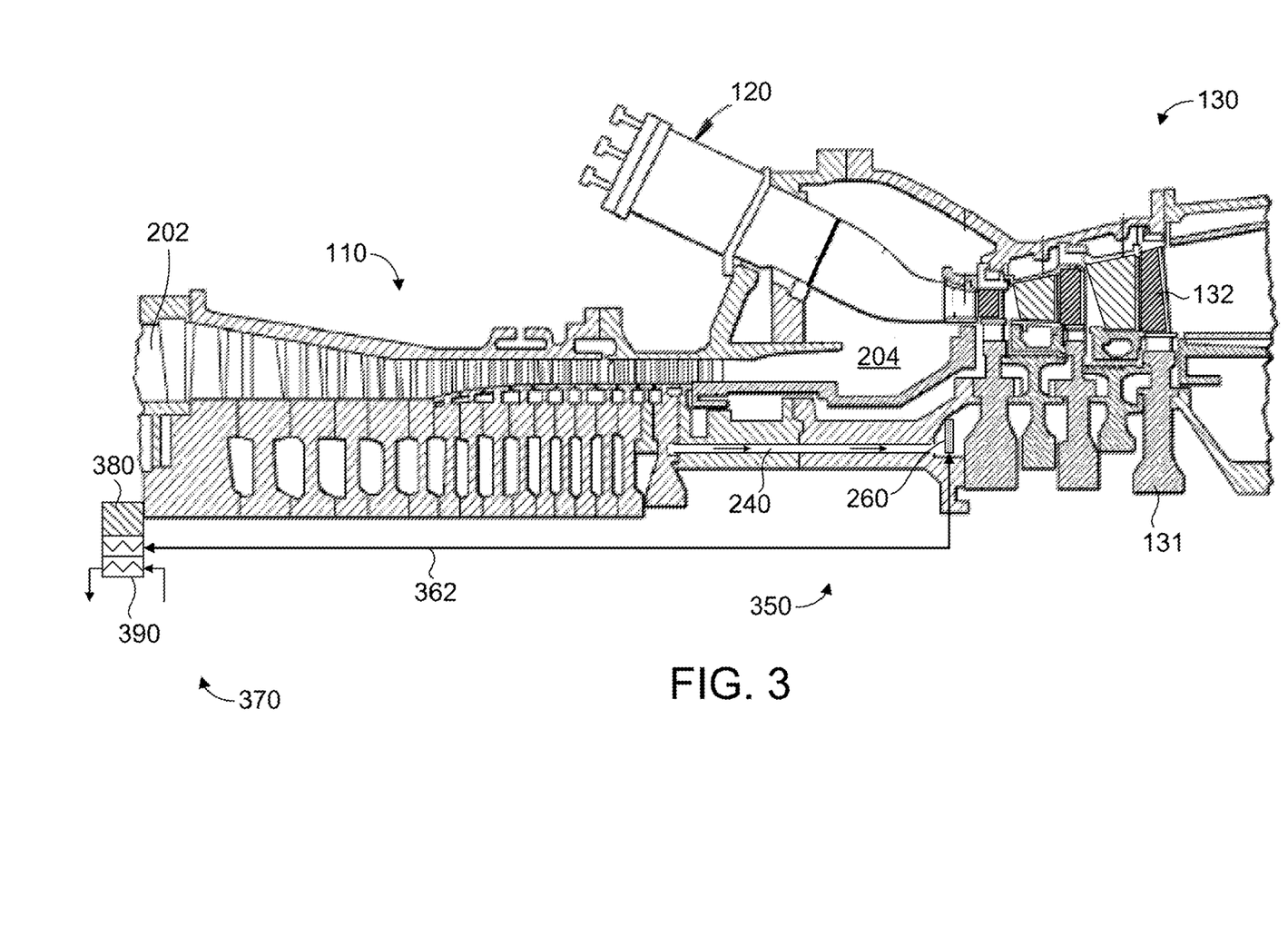
FIG. 3 illustrates a partially schematic, axial sectional view through a portion of the turbomachine, according to an aspect of the present invention.

FIG. 3 is a partially schematic, axial sectional view through a portion of the turbomachine, according to an aspect of the present invention. The cooling system 350 includes a plurality of heat pipes 260 located axially upstream of at least one of the plurality of wheels 131. The heat pipes 260 are operatively connected, via lines 362 to a bearing cooler system 370. Lines 362 may also be heat pipes. The bearing cooler system 370 cools bearing 380 (sometimes referred to as bearing #1) and the lubrication oil associated with the bearing 380. The heat pipes 260, 362 and the bearing cooler system 370 are configured to transfer heat from the compressor bleed off air (exiting from duct 240) to one or more heat exchangers 390.

The heat pipes 260, 262 include a heat transfer medium which may be a liquid metal, molten salt or Qu material. As examples only, the heat transfer medium may be one or combinations of, aluminum, beryllium, beryllium-fluorine alloy, boron, calcium, cesium, cobalt, lead-bismuth alloy, liquid metal, lithium-chlorine alloy, lithium-fluorine alloy, manganese, manganese-chlorine alloy, mercury, molten salt, potassium, potassium-chlorine alloy, potassium-fluorine alloy, potassium-nitrogen-oxygen alloy, rhodium, rubidium-chlorine alloy, rubidium-fluorine alloy, sodium, sodium-chlorine alloy, sodium-fluorine alloy, sodium-boron-fluorine alloy, sodium nitrogen-oxygen alloy, strontium, tin, zirconium-fluorine alloy. As one specific example, the heat transfer medium may be a molten salt comprising potassium, sodium or cesium. The outer portion of the heat pipes 260, 262 may be made of any suitable material capable of serving the multiple purposes of high thermal conductivity, high strength and high resistance to corrosion from the heat transfer medium.

The heat pipes 260, 262 may also be formed of a "Qu-material" having a very high thermal conductivity. The Qu-material may be in the form of a multi-layer coating provided on the interior surfaces of the heat pipes. For example, a solid state heat transfer medium may be applied to the inner walls in three basic layers. The first two layers are prepared from solutions which are exposed to the inner wall of the heat pipe. Initially the first layer which primarily comprises, in ionic form, various combinations of sodium, beryllium, a metal such as manganese or aluminum, calcium, boron, and a dichromate radical, is absorbed into the inner wall to a depth of 0.008 mm to 0.012 mm. Subsequently, the second layer which primarily comprises, in ionic form, various combinations of cobalt, manganese, beryllium, strontium, rhodium, copper, B-titanium, potassium, boron, calcium, a metal such as aluminum and the dichromate radical, builds on top of the first layer and forms a film having a thickness of 0.008 mm to 0.012 mm over the inner wall of the heat pipe. Finally, the third layer is a powder comprising various combinations of rhodium oxide, potassium dichromate, radium oxide, sodium dichromate, silver dichromate, monocrystalline silicon, beryllium oxide, strontium chromate, boron oxide, B-titanium and a metal dichromate, such as manganese dichromate or aluminum dichromate, which evenly distributes itself across the inner wall. The three layers are applied to the heat pipe and are then heat polarized to form a superconducting heat pipe that transfers thermal energy with little or no net heat loss.

Figure 4:
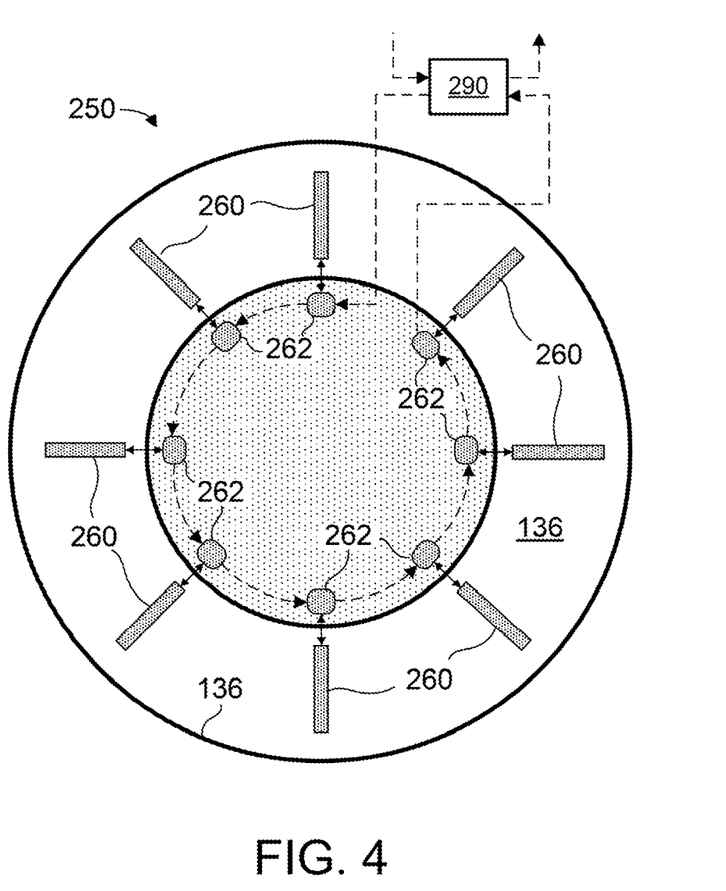
FIG. 4 illustrates a cross-sectional view of the cooling system, according to an aspect of the present invention.

FIG. 4 illustrates a cross-sectional and schematic view of the cooling system 250, according to another aspect of the present invention. The heat pipes 260 are located in the rotor barrel cooling chamber 136. The heat pipe 262, which is connected to heat pipes 260, extends to and is in thermal communication with bearing 280 and/or heat exchanger 290. The heat pipes 260 are arranged circumferentially about the rotor barrel cooling chamber 136. Heat from the compressor discharge bleed off air is transferred from the heat pipes 260, 262 to the bearing 280 and heat exchanger 290.

Figure 5:
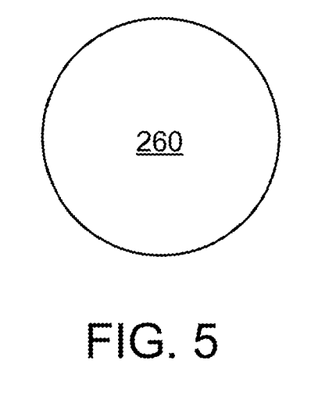
FIG. 5 illustrates a cross sectional shape of a circular or cylindrical heat pipe, according to an aspect of the present invention.
Figure 6:
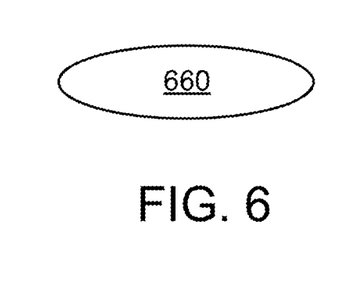
FIG. 6 illustrates a cross sectional shape of an oval heat pipe, according to an aspect of the present invention.
Figure 7:
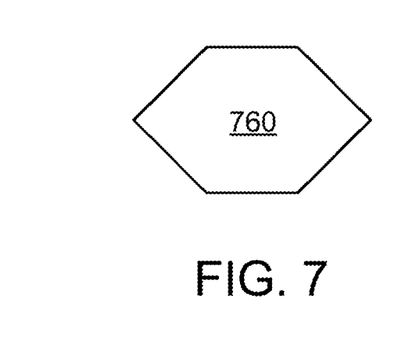
FIG. 7 illustrates a cross sectional shape of a polygonal heat pipe, according to an aspect of the present invention.
Figure 8:
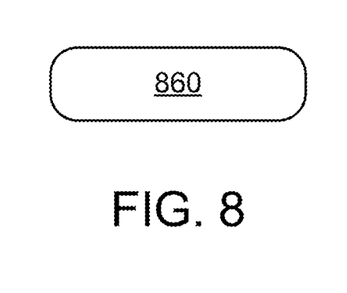
FIG. 8 illustrates a cross sectional shape of a rectangular with rounded corners heat pipe, according to an aspect of the present invention.
Figure 9:
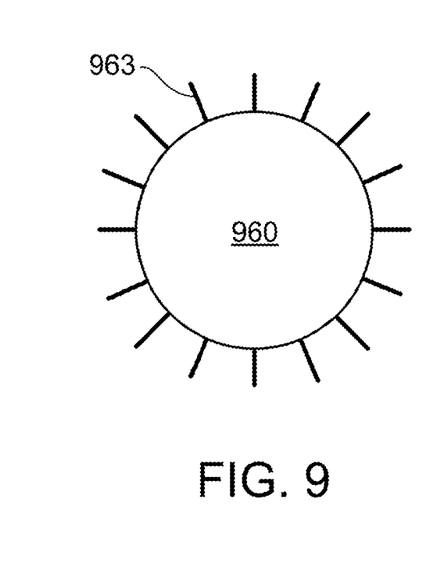
FIG. 9 illustrates a cross sectional shape of a circular or cylindrical heat pipe with a plurality of fins, according to an aspect of the present invention.

FIG. 5 illustrates a cross sectional shape of a circular or cylindrical heat pipe 260, according to an aspect of the present invention. A cylindrical heat pipe is easy to manufacture and install with conventional tools. FIG. 6 illustrates a cross sectional shape of an oval heat pipe 660, according to an aspect of the present invention. The oval heat pipe 660 may have improved heat transfer characteristics compared to the cylindrical heat pipe. FIG. 7 illustrates a cross sectional shape of a polygonal heat pipe 760, according to an aspect of the present invention. The polygonal shape may include rectangular, hexagonal, square or any other suitable polygonal shape. FIG. 8 illustrates a cross sectional shape of a rectangular with rounded corners heat pipe 860. The rectangular with rounded corners shape may have improved heat transfer characteristics over the oval heat pipe 660, due to increased surface area. FIG. 9 illustrates a cross sectional shape of a circular or cylindrical heat pipe 960 with a plurality of fins 963, according to an aspect of the present invention. The fins 963 are configured to increase the heat transfer capability of the heat pipe, may be arranged axially as shown or radially, and may be comprised of a material having high thermal conductivity, such as copper or aluminum.

Figure 10:
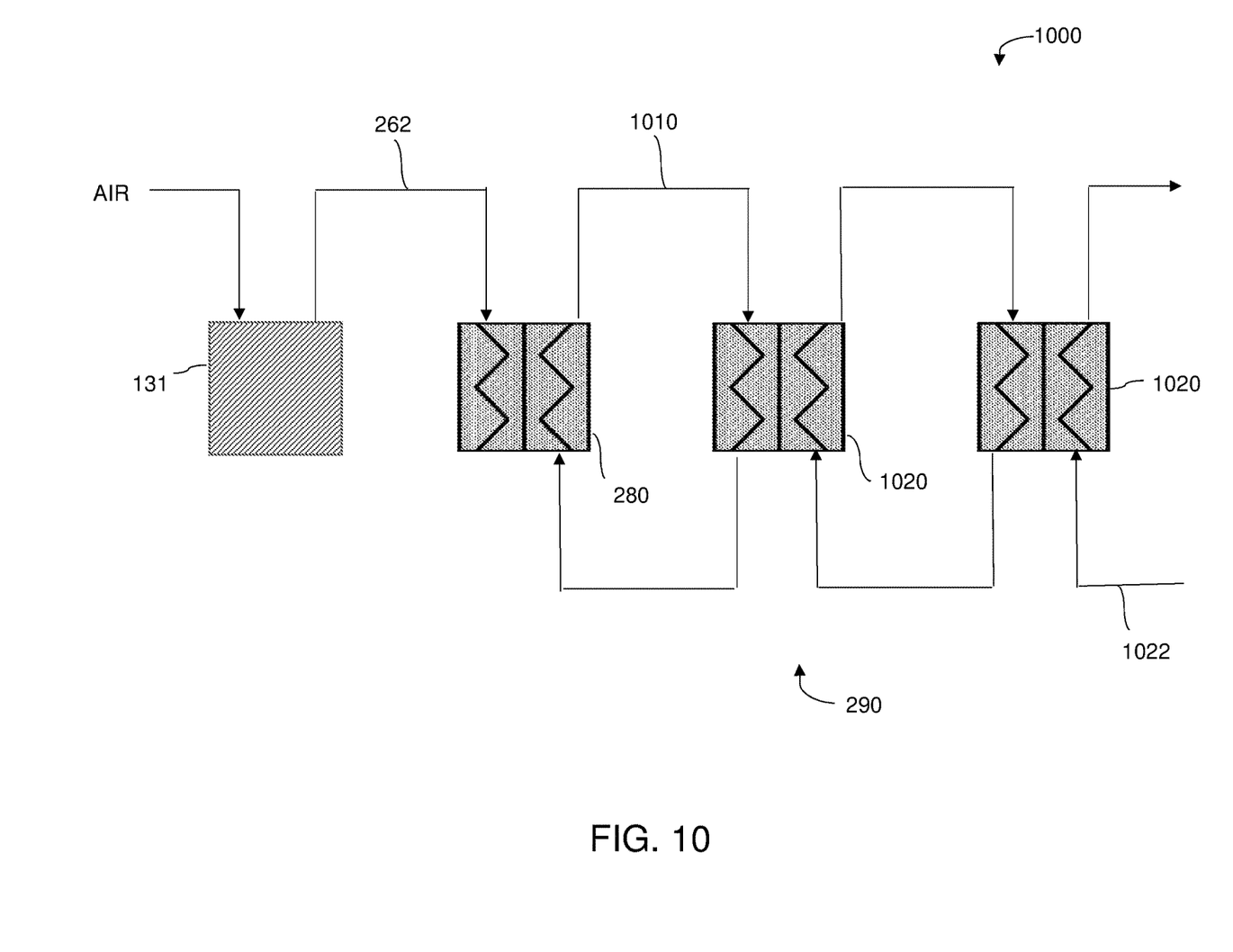
FIG. 10 illustrates a schematic representation of a cooling and thermal management system, according to an aspect of the present invention.

FIG. 10 illustrates a schematic representation of a cooling and thermal management system 1000, according to an aspect of the present invention. The compressor bleed off air exits duct 240 and impinges on wheel 131. The air may also travel through buckets 132. Heat from the bleed off air is absorbed by heat pipes 260, 262 and is conducted or transferred to bearing 280. The bearing lubrication oil 1010 absorbs heat from the bearing and the heat pipes 262, and a lubrication oil cooler/heat exchanger 1020 transfers the absorbed heat to a heat transfer medium 1022, such as ambient air or water. Referring back to FIGS. 2-4, heat exchanger 290, 390 may include some or all of bearing 280, oil 1010 and/or heat exchanger 1020.

Figure 11:
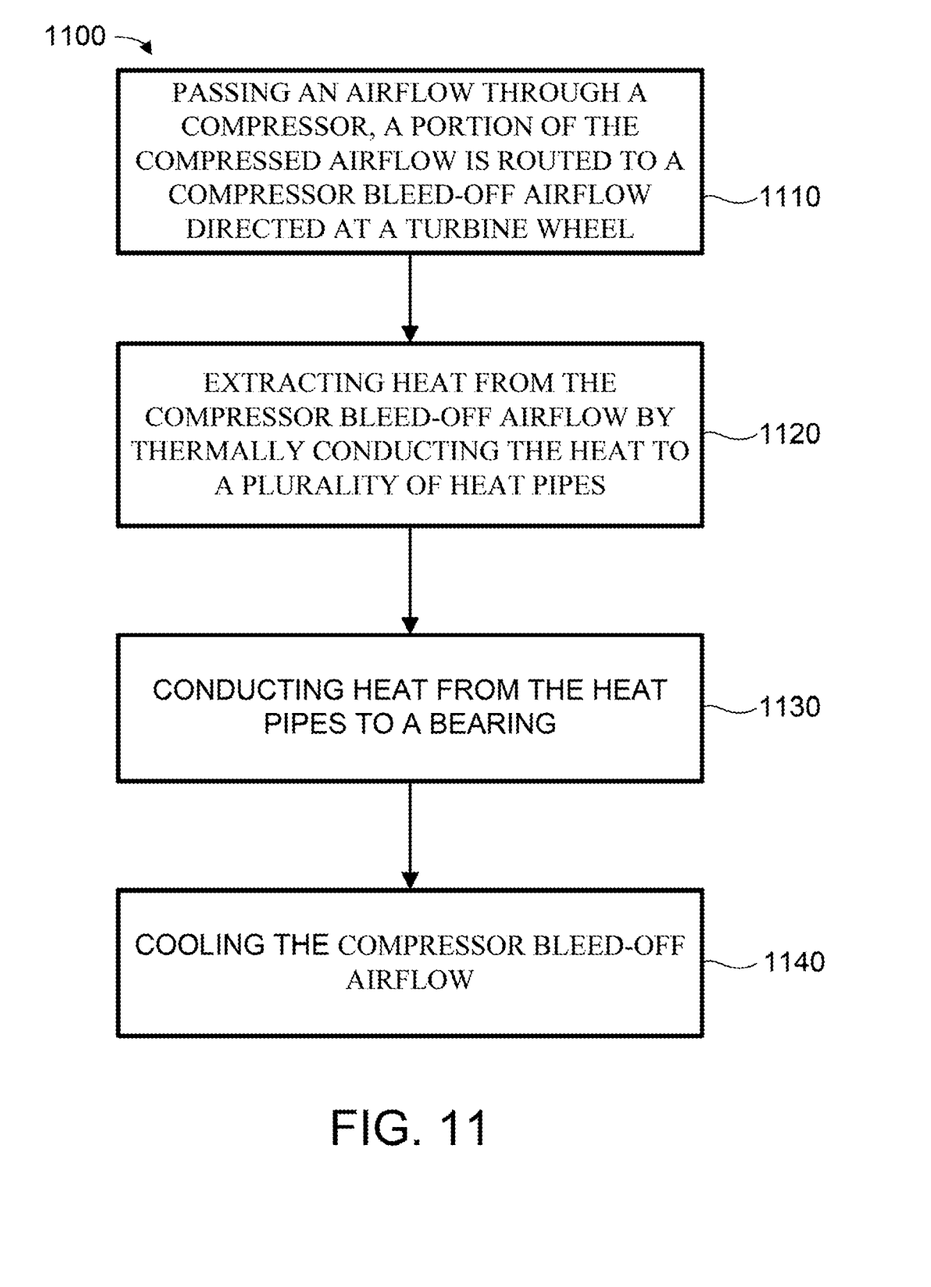
FIG. 11 illustrates a method for cooling a compressor bleed off airflow, according to an aspect of the present invention.

FIG. 11 illustrates a method 1100 for cooling a compressor bleed off airflow. The method includes a step 1110 of passing an airflow through a compressor 110. A portion of the compressed airflow is routed to a compressor bleed-off airflow, via duct 240 directed at a turbine wheel 131. An extracting step 1120 extracts heat from the compressor bleed-off airflow by thermally conducting heat to a plurality of heat pipes 260, 262. The heat pipes 260, 262 may include a molten salt heat transfer medium, such as, potassium, sodium, cesium, liquid metal or combinations thereof. The heat pipes 260, 262 are in thermal communication with one or more bearings 280, 380 and one or more heat exchangers 290, 390. A conducting step 1130 conducts heat from the heat pipes 260, 262 to the bearing. The compressor bleed-off airflow is cooled in step 1140.

The cooling and temperature management system of the present invention provides a number of advantages. The turbine section buckets and wheels may have improved lifespans due to the cooler compressor bleed-off airflow. There is also a reduced demand for compressor bleed-off air, and compressed air can be re-directed into the combustor for improved efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A turbomachine comprising:
a compressor configured to compress air received at an intake portion to form a compressed airflow that exits into an outlet portion;
a combustor operably connected with the compressor, the combustor receiving the compressed airflow;
a turbine operably connected with the combustor, the turbine receiving combustion gas flow from the combustor, the turbine having a plurality of wheels and a plurality of buckets, the turbine receiving compressor bleed off air to cool at least a portion of the plurality of wheels and at least a portion of the plurality of buckets; and
a cooling system operatively connected to the turbine, the cooling system including a first plurality of heat pipes located axially upstream of at least one of the plurality of wheels, the first plurality of heat pipes affixed to an inner circumference of and circumferentially around a rotor barrel cooling chamber, and including a second plurality of heat pipes operatively connected to the first plurality of heat pipes, the second plurality of heat pipes located within and circumferentially around the rotor barrel cooling chamber, the first and second plurality of heat pipes operatively connected to a bearing cooler system, the first and second plurality of heat pipes and the bearing cooler system are configured to transfer heat from the compressor bleed off air to one or more heat exchangers.

2. The turbomachine of claim 1, the first and second plurality of heat pipes further comprising a heat transfer medium including one or combinations of:
aluminum, beryllium, beryllium-fluorine alloy, boron, calcium, cesium, cobalt, lead-bismuth alloy, liquid metal, lithium-chlorine alloy, lithium-fluorine alloy, manganese, manganese-chlorine alloy, mercury, molten salt, potassium, potassium-chlorine alloy, potassium-fluorine alloy, potassium-nitrogen-oxygen alloy, rhodium, rubidium-chlorine alloy, rubidium-fluorine alloy, sodium, sodium-chlorine alloy, sodium-fluorine alloy, sodium-boron-fluorine alloy, sodium nitrogen-oxygen alloy, strontium, tin, zirconium-fluorine alloy.

3. The turbomachine of claim 1, the first and second plurality of heat pipes further comprising a molten salt heat transfer medium including one or combinations of, potassium, sodium or cesium.

4. The turbomachine of claim 1, the first plurality of heat pipes located axially upstream of a first stage turbine wheel.

5. The turbomachine of claim 1, the bearing cooler system further comprising bearing lubrication oil and a lubrication oil cooler, the lubrication oil cooler comprising at least one of the one or more heat exchangers configured to cool the bearing lubrication oil.

6. The turbomachine of claim 5, wherein the bearing cooler system is located:
   axially downstream of the turbine; or
   axially upstream of the turbine.

7. The turbomachine of claim 1, wherein the first plurality of heat pipes have a cross-sectional shape, the cross sectional shape comprising at least one of: circular, oval, rectangular with rounded corners, or polygonal; or a plurality of fins, the plurality of fins configured to increase the heat transfer capability of the first plurality of heat pipes.

8. The turbomachine of claim 1, wherein the first plurality of heat pipes are radially aligned with the second plurality of heat pipes.

9. A temperature management system for a turbomachine, the turbomachine comprising a compressor configured to compress air received at an intake portion to form a compressed airflow that exits into an outlet portion, a combustor operably connected with the compressor, the combustor receiving the compressed airflow, and a turbine operably connected with the combustor, the turbine receiving combustion gas flow from the combustor, the turbine having a plurality of wheels and a plurality of buckets, the turbine receiving compressor bleed off air from the compressor to cool at least a portion of the plurality of wheels, the temperature management system comprising:
   a first plurality of heat pipes located axially upstream of at least one of the plurality of wheels, the first plurality of heat pipes affixed to an inner circumference of and circumferentially around a rotor barrel cooling chamber, and including a second plurality of heat pipes operatively connected to the first plurality of heat pipes, the second plurality of heat pipes located within and circumferentially around the rotor barrel cooling chamber, the first and second plurality of heat pipes operatively connected to a bearing cooler system, the first and second plurality of heat pipes and the bearing cooler system are configured to transfer heat from the compressor bleed off air to one or more heat exchangers.

10. The system of claim 9, the first and second plurality of heat pipes further comprising a heat transfer medium including one or combinations of:
   aluminum, beryllium, beryllium-fluorine alloy, boron, calcium, cesium, cobalt, lead-bismuth alloy, liquid metal, lithium-chlorine alloy, lithium-fluorine alloy, manganese, manganese-chlorine alloy, mercury, molten salt, potassium, potassium-chlorine alloy, potassium-fluorine alloy, potassium-nitrogen-oxygen alloy, rhodium, rubidium-chlorine alloy, rubidium-fluorine alloy, sodium, sodium-chlorine alloy, sodium-fluorine alloy, sodium-boron-fluorine alloy, sodium nitrogen-oxygen alloy, strontium, tin, zirconium-fluorine alloy.

11. The system of claim 9, the first and second plurality of heat pipes further comprising a molten salt heat transfer medium including one or combinations of, potassium, sodium or cesium.

12. The system of claim 11, the first plurality of heat pipes located axially upstream of a first stage turbine wheel.

13. The system of claim 12, the bearing cooler system further comprising a bearing lubrication oil and a lubrication oil cooler, the lubrication oil cooler comprising at least one of the one or more heat exchangers configured to cool the bearing lubrication oil.

14. The system of claim 13, wherein the bearing cooler system is located:
   axially downstream of the turbine; or
   axially upstream of the turbine.

15. The system of claim 14, wherein the first plurality of heat pipes have a cross-sectional shape, the cross sectional shape comprising at least one of: circular, oval, rectangular with rounded corners, or polygonal; or a plurality of fins, the plurality of fins configured to increase the heat transfer capability of the first plurality of heat pipes.

16. The system of claim 9, wherein the first plurality of heat pipes are radially aligned with the second plurality of heat pipes.

17. A method of transferring heat from a turbomachine, the method comprising: passing an airflow through a compressor, the compressor acting on the airflow to create a compressed airflow, a portion of the compressed airflow is routed to a compressor bleed-off airflow directed at a turbine wheel of a plurality of wheels of a turbine;
   extracting the heat from the compressor bleed-off airflow by thermally conducting the heat to a first plurality of heat pipes located axially upstream of at least one of the plurality of wheels, the first plurality of heat pipes affixed to an inner circumference of and circumferentially around a rotor barrel cooling chamber, and including a second plurality of heat pipes operatively connected to the first plurality of heat pipes, the second plurality of heat pipes located within and circumferentially around the rotor barrel cooling chamber, the first and second plurality of heat pipes in thermal communication with one or more heat exchangers; and
   conducting the heat from the first and second plurality of heat pipes to a bearing, the bearing having a lubrication oil, the lubrication oil transferring the heat to a lubrication oil cooler; wherein the compressor bleed-off airflow is cooled by the first and second plurality of heat pipes.

18. The method of claim 17, the first and second plurality of heat pipes further comprising a molten salt heat transfer medium including one or combinations of, potassium, sodium, or cesium.

19. The method of claim 18, the first plurality of heat pipes located axially upstream of a first stage turbine wheel.

20. The method of claim 19, wherein the bearing is located:
   axially downstream of the turbine; or
   axially upstream of the turbine.

* * * * *